(12) United States Patent
Foti et al.

(10) Patent No.: US 6,418,971 B1
(45) Date of Patent: Jul. 16, 2002

(54) FLEXIBLE METAL CONDUIT

(75) Inventors: Sam J. Foti, Lyndurst; Santo Foti, Richmond Hts., both of OH (US)

(73) Assignee: Hose Master, Inc., Cleveland, OH (US)

( * ) Notice: Subject to any disclaimer, the term of this patent is extended or adjusted under 35 U.S.C. 154(b) by 0 days.

(21) Appl. No.: 09/901,719

(22) Filed: Jul. 10, 2001

(51) Int. Cl.[7] .............................................. F16L 11/16
(52) U.S. Cl. ...................... 138/135; 138/134; 138/122; 138/154
(58) Field of Search .............................. 138/121, 134, 138/135, 154, 156, 157, 122

(56) References Cited

U.S. PATENT DOCUMENTS

| | | | |
|---|---|---|---|
| 1,978,529 A | * 10/1934 | Harrah | 138/135 X |
| 3,435,852 A | 4/1969 | Trihey | 138/122 |
| 3,815,639 A | * 6/1974 | Westerbarkey | 138/135 |
| 3,865,146 A | * 2/1975 | Meserole | 138/135 X |
| 3,913,623 A | 10/1975 | Siegwart | 138/122 |
| 3,938,558 A | * 2/1976 | Anderson | 138/135 X |
| 4,197,728 A | 4/1980 | McGowen | 72/49 |
| 4,486,484 A | * 12/1984 | Schafer | 138/135 X |
| 4,509,560 A | 4/1985 | Schafer | 138/122 |
| 5,074,138 A | * 12/1991 | Miller | 138/135 X |
| 5,158,115 A | * 10/1992 | Miller | 138/154 X |
| 5,158,814 A | * 10/1992 | Foti | 138/135 X |
| 5,228,479 A | * 7/1993 | Thomas | 138/135 X |
| 5,490,930 A | 2/1996 | Krull | 210/443 |

OTHER PUBLICATIONS

Date Sheet 310, "Zirconium Hydroxide" Jan. 1985.

* cited by examiner

Primary Examiner—Patrick Brinson
(74) Attorney, Agent, or Firm—Watts Hoffmann Fisher & Heinke

(57) ABSTRACT

A flexible metal conduit is disclosed that comprises a thin metal ribbon arranged in a helix about a longitudinal axis. Convolutions of the helix are disposed adjacent each other with the ribbon defining helical, sinuously corrugated inwardly and outwardly facing conduit surfaces forming radially inner and radially outer apices that are spaced substantially evenly apart and extend parallel to the convolution edges. A first ribbon edge region is defined by a partial corrugation and a flange extending radially from the partial corrugation. A second ribbon edge region is defined by a second partial corrugation and a second flange extending radially from the second partial corrugation. The first and second partial corrugations abut to form a helical seam running along the convolution junctures. The first and second edge flanges abut at the corrugation seam and are interlocked to secure the convolutions together. The flanges are tightly rolled together to form a bead-like structure having a generally circular cross sectional shape. The composite corrugation has a radially inner apex, with the flanges interlocked radially outwardly from the radially inner apex.

12 Claims, 3 Drawing Sheets

FLEXIBLE METAL CONDUIT

FIELD OF THE INVENTION

The present invention relates to hoses and more particularly to flexible metal hoses that are constructed from helically wound metal ribbons that have interlocked, hermetic convolutions.

BACKGROUND OF THE INVENTION

Flexible metal conduits made from thin sheet metal ribbons which are convoluted and joined at their edges have been constructed in the past. So-called "interlocked" conduit is a relatively commonplace example. Interlocked conduit employed thin metal ribbons wound helically with their convolutions secured together by reversely curved ribbon edges which were interlocked. The interlocked edges permitted limited play between adjacent convolutions so the conduit could be flexed. U.S. Pat. No. 4,197,728, issued Apr. 15, 1980, discloses a conduit constructed in this manner.

Interlocked metal conduits were, and remain, in widespread use and perform in a generally satisfactory way. In some applications however, these conduits have had inadequate flexibility, convolutions have separated when too much bending was experienced, and the interlocked joints themselves have not exhibited adequate hoop strength. These deficiencies have been primarily limited to applications where relatively thin walled fairly large diameter conduits are specified.

Other flexible metal conduit constructions have been proposed in which flexibility is gained primarily by the manner of formation of the conduit convolutions. U.S. Pat. No. 4,486,484 issued Dec. 4, 1984, discloses such a conduit formed from convoluted metal ribbon which is corrugated. In this construction the helical corrugations provide flexibility while the joint between the convolutions is relatively inflexible. Other corrugated convoluted conduits have been proposed in which the convolution joints are tightly crimped but these have drawbacks related to the joint strength, the joint flexibility and/or the ability of the conduit material to form the joint.

One such conduit is disclosed by U.S. Pat. No. 5,158,814, issued Oct. 27, 1992. That conduit was particularly useful as a chimney flue because it could be flexed to avoid obstructions when installed in a building structure and the junctures of its convolutions were hermetic so that flue gases did not escape into the building. The convolution interlocking structure was formed by ribbon edge flanges that were rolled together to form a multiply hollow bead that extended along and immediately adjacent a corrugation at the convolution junctures. The hose appeared to be formed with a double corrugation running helically along its length because the bead was approximately the same size as the corrugation. The bead and immediately adjacent corrugation combined to substantially stiffen the conduit in the vicinity of the convolution juncture. Even though the remaining corrugations were flexible and enabled flexing the conduit somewhat during installation, the helically extending bead interlock structure, adjacent a corrugation, stiffened the conduit and therefore limited its use. This excessive stiffness was particularly troublesome in building flue applications where the such conduits had to be flexed in order to route them around obstructions The present invention provides a new and improved flexible metal conduit wherein the convolution junctures are formed as part of a regular corrugation and the convolution interlock structure does not reduce the conduit flexibility in the vicinity of the convolution junctures.

SUMMARY OF THE INVENTION

A flexible metal conduit constructed according to a disclosed embodiment of the invention comprises a thin metal ribbon arranged in a helix about a longitudinal axis. Convolutions of the helix are disposed adjacent each other with the ribbon defining helical, sinuously corrugated inwardly and outwardly facing conduit surfaces forming radially inner and radially outer apices that are spaced substantially evenly apart and extend helically along the conduit. A first ribbon edge region is defined by a partial corrugation and a flange extending radially from the partial corrugation. A second ribbon edge region is defined by a second partial corrugation and a second flange extending radially from the second partial corrugation. The first and second partial corrugations abut to form a helical seam running along the convolution junctures in an otherwise substantially continuous corrugation on one conduit surface. The first and second edge flanges abut at the composite corrugation seam and are interlocked adjacent the other conduit surface to secure the convolutions together.

In the disclosed embodiment the flanges are tightly rolled together to form a bead-like structure having a generally circular cross sectional shape. The first and second partial corrugations form a single corrugation having a radially inner apex, with the flanges interlocked radially outwardly from the radially inner apex. The disclosed conduit has edge flanges that abut at the radially inner apex of the composite corrugation formed by the first and second partial corrugations. The flanges are interlocked to form a bead-like locking structure that is disposed radially outwardly from the radially inner apex of the composite corrugation.

Other features and advantages of the invention will become apparent from the following detailed description of a preferred embodiment made with reference to the accompanying drawings.

BEST MODE OF PRACTICING THE INVENTION

Figure 1:
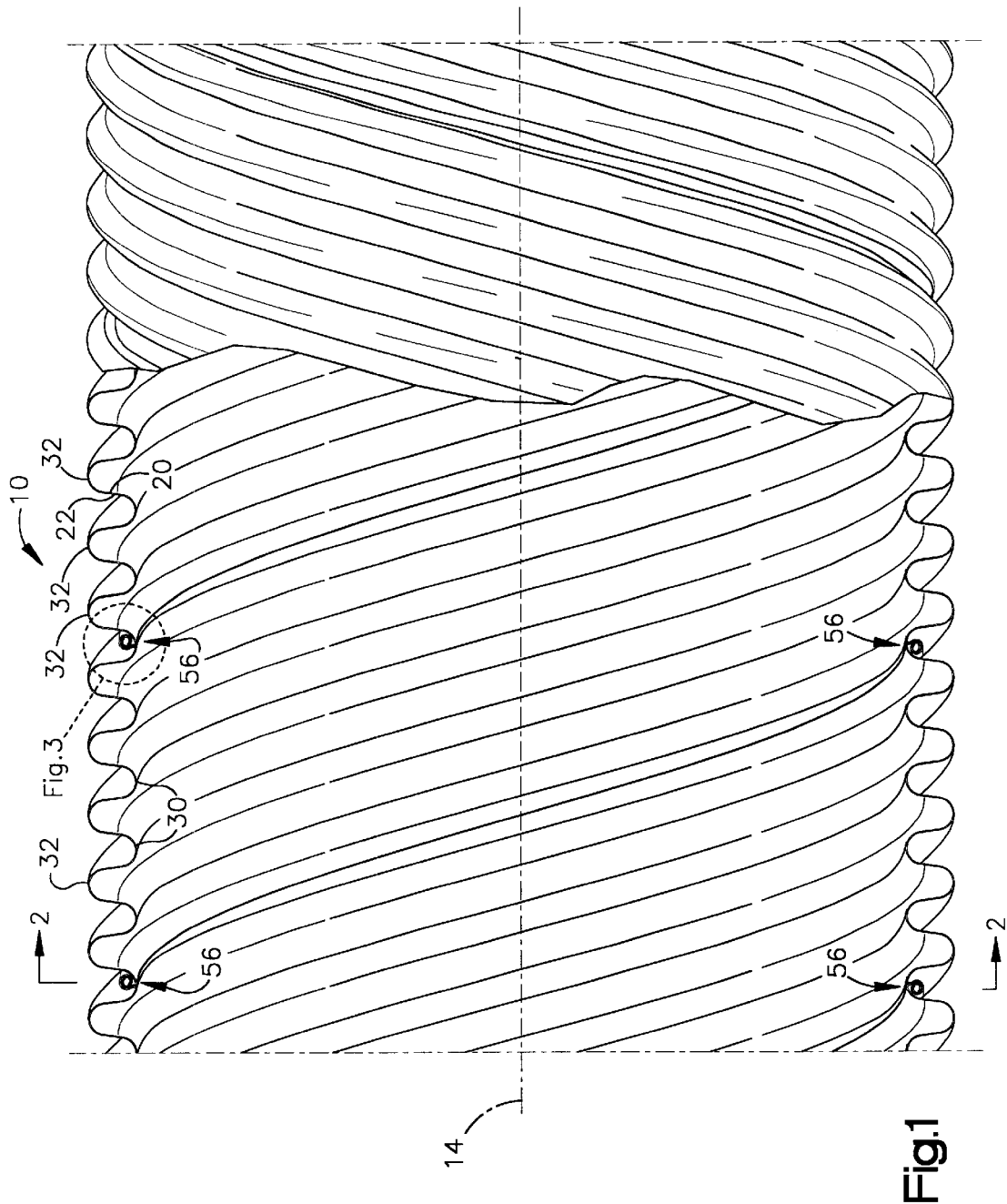
FIG. 1 is a cross sectional view of a length of conduit embodying the invention.
Figure 2:
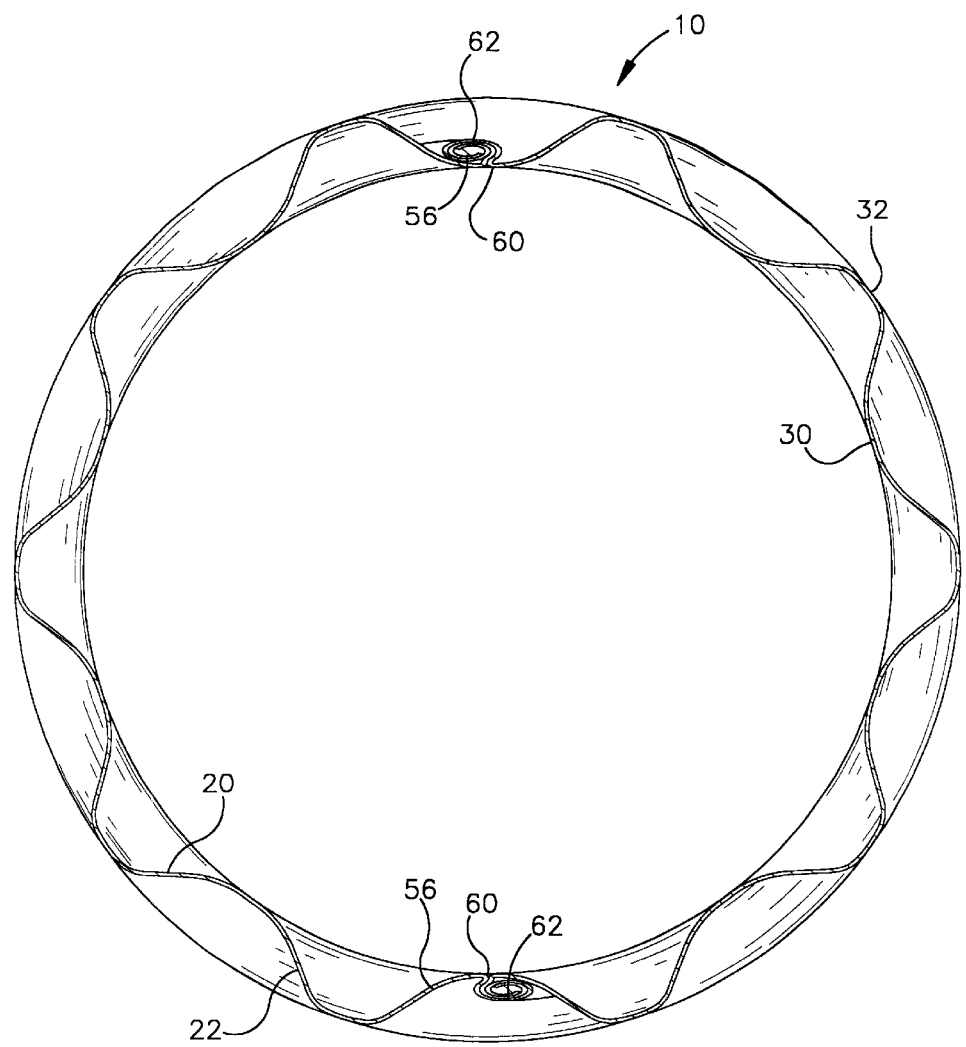
FIG. 2 is a view seen approximately from the plane indicated by the line 2—2 of FIG. 1; and, FIG. 3 is an enlarged fragmentary view of part of the conduit of FIG. 1 within the line 3—3 of FIG. 1.
Figure 3:
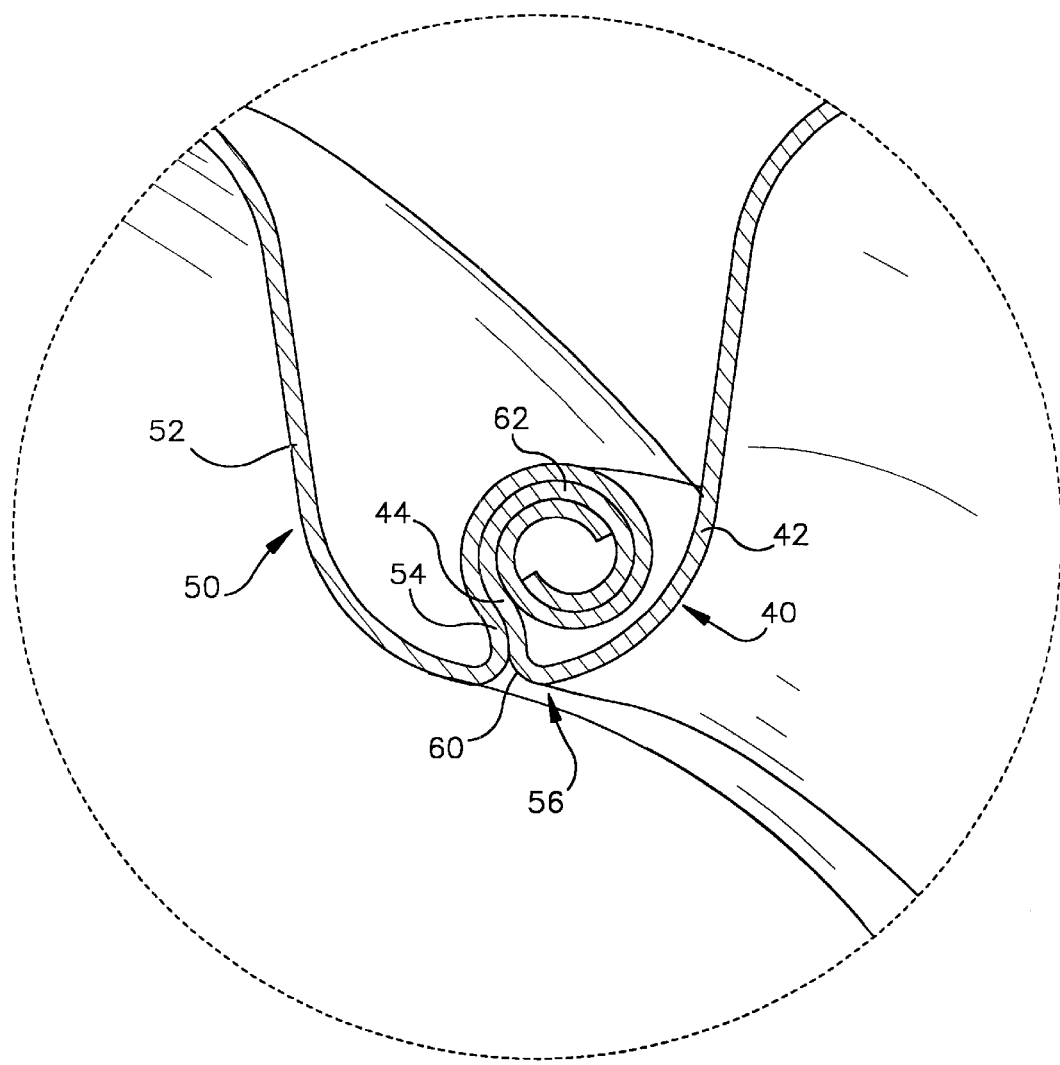

A flexible metal conduit 10 constructed according to the invention is illustrated by FIGS. 1–3 of the drawings. The conduit 10 is formed by a thin flat metal ribbon 12 that is passed through forming dies and wound around a mandrel so that the ribbon 12 is arranged in a helix about a longitudinal axis 14. Convolutions of the helix are disposed adjacent each other and are interlocked to form a continuous conduit. Dies, the mandrel and associated machinery of the general type used for fabricating the conduit 10 are illustrated and described in U.S. Pat. No. 5,158,814, issued Oct. 27,1992 which is incorporated herein in its entirety by this reference to it.

The dies deform the ribbon 12 to produce corrugated inwardly and outwardly facing conduit surfaces 20, 22 that extend parallel to the ribbon edges. When the ribbon is passed around the mandrel and the conduit is formed, the conduit has a circular cross sectional shape and the corrugations extend helically along the length of the conduit. The corrugations are formed by radially inner and radially outer apices, 30, 32, respectively. The apices 30, 32 are spaced substantially evenly apart and extend helically along the length of the conduit. In the illustrated conduit, the corrugations are sinusoidal in shape but they could assume other suitable shapes, if desired.

Referring to FIG. 3, a first ribbon edge region 40 is defined by a partial corrugation 42 and a flange 44 extending radially from the partial corrugation. A second ribbon edge region 50 is defined by a second partial corrugation 52 and a second flange 54 extending radially from the second partial corrugation. The first and second partial corrugations of adjacent convolution locations abut when the hose is formed. The abutting partial corrugations combine to form a single composite corrugation 56 having a helical seam 60 running along the convolution junctures. But for the seam 60, the composite corrugation 56 is an otherwise continuous corrugation that extends the length of the conduit. The illustrated composite corrugation 56 is substantially the same shape and size as the remaining corrugations and is spaced uniformly from the adjacent corrugations.

In the illustrated embodiment of the invention the partial corrugations 42, 52 abut at the apex 30 of the composite corrugation with each partial corrugation defining one half of the composite corrugation. The result of this structure is that the composite corrugation flexes in substantially the same manner and at least to the same degree as the remaining corrugations, avoiding a condition where the juncture of the hose convolutions is markedly more resistant to flexure than the intervening regions.

The flanges 44, 54 extend radially from the seam 60 and are secured together by an interlock structure 62 that securely attaches the convolutions. In the illustrated embodiment of the invention the flanges are tightly wound together so that the juncture of the convolutions not only is securely fastened but also is hermetic. The illustrated interlock structure 62 is formed by rolling the flanges together to form a helical bead-like structure that, in cross section, is generally circular and defines a two-ply spiral wall surrounding an open center. In the illustrated conduit 10 the interlock structure 62 is formed along the outer conduit surface 22 and extends radially outwardly from the radially inner apex 30 of the composite corrugation 56. In the illustrated conduit the interlock structure 62 is relatively small compared to the dimensions of the composite corrugation 56 and it is positioned within the concave side of the composite corrugation 56. The interlock structure is spaced from the ribbon forming the corrugation 56 so that it does not interfere with flexure of the corrugation 56 as the hose flexes 10.

While a single embodiment of the invention is illustrated and described herein the present invention is not to be considered limited to the precise construction shown. Various adaptations, modifications and uses of the invention may occur to those skilled in the art to which the invention relates. The intention is to cover hereby all such adaptations, modifications and uses that fall within the spirit or scope of the appended claims.

What is claimed is:

1. A flexible metal conduit constructed from a single thin metal ribbon arranged in a helix about a longitudinal axis, convolutions of the helix disposed adjacent each other to form a single ply conduit wall with the ribbon defining helical, sinuously corrugated inwardly and outwardly facing conduit surfaces forming radially inner and radially outer apices that are spaced substantially evenly apart and extend helically along the conduit, a first ribbon edge region defined by a partial corrugation and a flange extending radially from the partial corrugation, a second ribbon edge region defined by a second partial corrugation and a second flange extending radially from the second partial corrugation, said first and second partial corrugations abutting to form a composite single ply corrugation, the abutment location of said flanges defining a seam running along the convolution junctures on one of said conduit surfaces, said first and second edge flanges abutting at the seam and extending radially therefrom to an interlock structure by which said flanges are secured together.

2. The conduit claimed in claim 1 wherein the interlock structure is formed by said flanges being tightly rolled together to form a bead-like structure having a generally circular cross sectional shape.

3. The conduit claimed in claim 2 wherein said composite corrugation defines a radially inner apex, said flanges interlocked radially outwardly from said radially inner apex.

4. The conduit claimed in claim 1 wherein said flanges abut at a radially inner apex of said composite corrugation.

5. The conduit claimed in claim 4 wherein said flanges extend radially outwardly from said radially inner apex.

6. The conduit claimed in claim 5 wherein said flanges are interlocked to form a bead-like structure that is disposed radially outwardly from the radially inner apex of the composite corrugation.

7. A flexible metal conduit constructed from a thin metal ribbon arranged in a helix about a longitudinal axis, convolutions of the helix disposed adjacent each other with the ribbon defining helical, sinuously corrugated inwardly and outwardly facing conduit surfaces forming radially inner and radially outer apices that are spaced substantially evenly apart and extend helically along the conduit, a first ribbon edge region defined by a partial corrugation and a flange extending radially from the partial corrugation, a second ribbon edge region defined by a second partial corrugation and a second flange extending radially from the second partial corrugation, said first and second partial corrugations abutting to form a composite corrugation, the abutment location of said flanges defining a seam running along the convolution junctures on one of said conduit surfaces, said first and second edge flanges abutting at the seam and extending in confronting surface engagement radially from said seam to an interlock structure by which said flanges are secured together, said interlock structure spaced from at least one of said first and second partial corrugations.

8. The conduit claimed in claim 7 wherein the interlock structure is formed by said flanges being tightly rolled together to form a bead-like structure having a generally circular cross sectional shape.

9. The conduit claimed in claim 8 wherein said composite corrugation defines a radially inner apex, said flanges interlocked radially outwardly from said radially inner apex.

10. The conduit claimed in claim 7 wherein said flanges abut at a radially inner apex of said composite corrugation.

11. The conduit claimed in claim 10 wherein said flanges extend radially outwardly from said radially inner apex.

12. The conduit claimed in claim 11 wherein said flanges are interlocked to form a bead-like structure that is disposed radially outwardly from the radially inner apex of the composite corrugation.

* * * * *